United States Patent [19]

Davis et al.

[11] Patent Number: 4,536,332

[45] Date of Patent: Aug. 20, 1985

[54] TALL'OIL FATTY ACIDS-QUALITY IMPROVEMENT

[75] Inventors: Curry B. Davis, Panama City, Fla.; Americo G. P. Frade, Cherry Hill, N.J.

[73] Assignee: Arizona Chemical Company, Fair Lawn, N.J.

[21] Appl. No.: 549,056

[22] Filed: Nov. 7, 1983

[51] Int. Cl.$^3$ .................. B01J 19/12; C02F 1/32; C09F 1/02
[52] U.S. Cl. .................. 260/97.6; 210/748; 260/97.7; 204/158 R
[58] Field of Search .............. 204/158 R; 210/748; 260/97.7

[56] References Cited

U.S. PATENT DOCUMENTS 3,377,333  4/1968  Ciesielski et al. .............. 260/97.6
3,597,344  8/1971  Case .............................. 204/162 HE
4,402,836  9/1983  Fochtman et al. ............... 210/748

*Primary Examiner*—Howard S. Williams
*Attorney, Agent, or Firm*—W. T. Zielinski; J. S. Cinamon

[57] ABSTRACT

Distilled tall oil fatty acids are improved by irradiation which isomerizes trans-dimethoxystilbene (trans-DMS) impurity to cis-dimethoxystilbene which is easily removed by fractional distillation. Thus, the trans-DMS is removed without loss of fatty acid components from the distilled tall oil fatty acid.

3 Claims, No Drawings

TALL'OIL FATTY ACIDS-QUALITY IMPROVEMENT

The invention relates to improvements in the manufacture of refined tall oil fatty acids. The invention provides a refined tall oil fatty acid product which has been improved by reducing the amount of unsaponifiables in the product. The invention also provides an improved method for separation of trans-dimethoxystilbene from tall oil fatty acids.

Trans-dimethoxystilbene (DMS) is unsaponifiable and represents roughly 20% by wt. of the total unsaponifiables in a typical distilled talk oil fatty acid. Unsaponfiables are undesirable impurities in tall oil fatty acid because they impair the quality of the fatty acid product. Trans-DMS is a particularly undesirable impurity because it generates a red color when the tall oil fatty acids are epoxidized. One use for premium quality refined tall oil fatty acids is to make certain plasticizers by methods which require epoxidizing of the fatty acids. Trans-DMS is also troublesome because it is difficult to separate from the fatty acids by fractional distillation; its boiling point lies between those of the palmitic acid and the non-conjugated linoleic acid components of the tall oil fatty acids. The invention provides a economical and efficient way to remove or at least reduce the trans-DMS content of tall oil fatty acids, and thus improve the quality of the tall oil fatty acid product without undue loss of the fatty acids in the process.

In the prior art, trans-DMS was separated from distilled tall oil fatty acids by conversion to relatively non-volatile products. A catalytic method using $BF_3$ was described in U.S. Pat. No. 3,433,815. Another method, using formaldehyde with clay, was described in U.S. Pat. No. 3,066,160. Those methods required a loss of about 5% by wt. of the fatty acid product in order to remove less than 1% by wt. of trans-DMS. The present invention produces a refined fatty acid product having substantially reduced trans-DMS content by a process which does not adversely affect the yield of refined fatty acid product.

According to the invention, distilled tall oil fatty acids, or fatty acid esters made therefrom, are irradiated to isomerize at least part of the trans-DMS to the cis-DMS isomer which has a lower boiling point than the trans-DMS and the fatty acids. The cis-DMS isomer is then readily separated from the tall oil with other low-boiling impurities by fractional distillation.

Actinic radiation will selectively isomerize the naturally occurring and thermodynamically stable trans-dimethoxystilbene to cis-3,5-dimethoxylstilbene. Tall oil fatty acids which ordinarily contain from one to five percent by wt. of unsaponfiables and from 0.1 to 1% by wt. of trans-DMS have been successfully refined by the process of the invention to reduce the amount of residual trans-dimethoxystilbene in the product.

The spectrum of actinic radiation that is effective for the photoisomerization has not been precisely determined, but it includes wavelengths in the ultraviolet region. An ordinary ultraviolet lamp is suitable for use in the process of the invention. Any other suitable source of actinic radiation at any wavelengths that will cause the photoisomerization may be used. The isomerization is a first order reaction; the rate will depend on several factors including the amount of radiation applied, the amount and specific compositions of the selected tall oil to be treated, the concentration of trans-DMS in the composition treated, etc. With the apparatus we have used, as described below, concentration of trans-DMS has been reduced substantially in samples of several different distilled tall oil fatty acids, by irradiation with ultraviolet light for a few hours. In none of those was there any evidence of side reactions involving photolysis of any of the other complex components in the samples irradiated.

The cis-DMS product of the irradiation treatment is readily separated from the fatty acids by fractional distillation without loss of fatty acids. It is convenient to irradiate the distilled tall oil fatty acid before it has been further refined for removal of unsaponifiables by fractional distillation. The cis-DMS is then readily separated with other unsaponifiables by the usual distillation for that purpose.

The invention is described in more detail by reference to the following specific examples.

EXAMPLE 1

A 175 watt, medium pressure mercury vapor lamp having a quartz bulb is enclosed in a glass tube made of COREX ® 9701 glass which is transparent down to about 3,000 Å in the ultraviolet region. The lamp and tube are immersed in a 1750 g. sample of distilled tall oil fatty acid which is contained in a 2-liter, 3-neck flask fitted with a thermometer, a magnetic stirrer and a nitrogen purge. With the lamp operating and with ambient air cooling the flask, the temperature in the flask equilibrates at about 85° C. The sample is irradiated continuously, and thief samples are removed at intervals to determine residual trans-DMS content. The irradiation is continued until the trans-DMS content has been reduced to a desired low concentration. This procedure is repeated using samples of three tall oil fatty acids (identified by tradename in Table 1) which are available commercially and one sample of a solution of trans-DMS in acetic acid. In Table 1 the results are tabulated, showing the decrease in trans-DMS concentration as irradiation is continued. The photolysis rates varied for the several samples that were irradiated, indicating the differing effects of the sample compositions on the rate.

TABLE 1

Photoisomerization of Trans-DMS in Tall Oil Fatty Acids
Trans-DMS Concentration
% - by weight

| Material | Irradiation Time Hours | | | | | | |
|---|---|---|---|---|---|---|---|
| | 0 | 2 | 4 | 8 | 12 | 16 | 25 |
| ACINTOL ® D6 LR | 0.75 | 0.55 | 0.42 | 0.22 | 0.125 | 0.07 | — |
| Acintol FA 1 | 0.75 | 0.53 | 0.37 | 0.12 | .095 | .05 | .01 |
| Acintol FA x | 0.23 | 0.085 | 0.035 | — | — | — | — |
| Control Trans-DMS in Acetic Acid | .75 | .22 | .06 | | | | |

The result of the irradiation treatment is isomerization of the trans-DMS to cis-DMS by photolysis. Following the irradiation treatment, the cis-isomer can be removed by distillation as illustrated by the following example.

EXAMPLE 2

A portion from a large sample of ACINTOL ® D6LR distilled tall oil fatty acid is irradiated as in Example 1 for time sufficient to reduce concentration of trans-DMS from 0.70% by wt. initial concentration to 0.25%. Two thousand grams from the irradiated portion is fractionally distilled using a packed fractionating column which is six feet high. The column is operated with 4.4 mm Hg vacuum at the column head and with a 5 to 1 reflux ratio. Four fractions are condensed from vapors taken from the still head over a temperature range from 135° C. to 205° C. All of the cis-DMS is found by analysis in the first fraction removed by distillation. The residue left after the fractionation contains 0.19% by wt. of trans-DMS. Another portion from the same sample of ACINTOL D6LR distilled tall oil is fractionated by the same procedure except this portion has not been irradiated before the distillation. The residue after fractionation of this sample contains 0.60% by wt. of trans-DMS.

The concentration of trans-DMS in the irradiated fatty acid can be reduced to values below 0.25% by continuing the irradiation for a longer time. The distillation product will consequently contain less trans-DMS than in the foregoing example.

The cis-DMS isomer in the fraction separated from the fatty acids, can be further refined to make a useful product. By means of a catalytic isomerization with noble metal catalyst or with iodine catalyst, the cis-isomer can be converted back to trans-DMS which can then be separated and purified by conventional techniques, for use as an algicide.

We claim:

1. A process comprising selective photolysis of trans-3,5-dimethoxystilbene to cis-3,5-dimethoxystilbene in distilled tall oil fatty acid by irradiation of the distilled tall oil fatty acid with artificially generated actinic radiation.

2. A process defined by claim 1 wherein the artificially generated actinic radiation is ultraviolet radiation.

3. A process defined by claim 1 further comprising distillation of the irradiated tall oil fatty acid to separate cis-3,5-dimethoxystilbene from the tall oil fatty acid by fractional distillation.

* * * * *